United States Patent [19]

Ronge et al.

[11] Patent Number: 4,540,635
[45] Date of Patent: Sep. 10, 1985

[54] MODIFIED COLOPHONY ROSINS, A PROCESS FOR THEIR PREPARATION, THEIR USE AND PAPER-SIZING AGENTS CONTAINING SUCH MODIFIED COLOPHONY ROSINS

[75] Inventors: Helmut Ronge; Erhard Prantz; Wolfgang Schoerkhuber, all of Krems, Austria

[73] Assignee: Krems-Chemie, Gesellschaft mbH, Krems, Austria

[21] Appl. No.: 589,982

[22] Filed: Mar. 15, 1984

[30] Foreign Application Priority Data

Jan. 19, 1984, [AT] Austria .................,.......................... 169/84

[51] Int. Cl.³ .......................... B32B 9/06; C08L 93/00
[52] U.S. Cl. .................................... 428/498; 106/238; 260/102
[58] Field of Search ................. 106/218, 238; 260/102

[56] References Cited

U.S. PATENT DOCUMENTS

| | | | |
|---|---|---|---|
| 2,419,816 | 4/1947 | Brown | 260/102 |
| 2,686,732 | 8/1954 | Montgomery | 106/238 |
| 2,985,537 | 5/1961 | Watkins | 106/238 |
| 3,288,774 | 11/1966 | Cyba | 260/102 |

FOREIGN PATENT DOCUMENTS 859787 1/1961 United Kingdom .

*Primary Examiner*—Theodore Morris
*Attorney, Agent, or Firm*—Sprung, Horn, Kramer & Woods

[57] ABSTRACT

The colophony rosins which have been esterified with a tertiary amino alcohol are disclosed. These colophony rosins which are normally also reinforced with formaldehyde and/or an α,β-unsaturated carbonyl compounds are useful in the form of an aqueous dispersion as a paper sizing agent. Disclosed are processes for the formation of such colophony rosins and paper sizing agents containing the same as well as papers so sized.

23 Claims, No Drawings

MODIFIED COLOPHONY ROSINS, A PROCESS FOR THEIR PREPARATION, THEIR USE AND PAPER-SIZING AGENTS CONTAINING SUCH MODIFIED COLOPHONY ROSINS

The present invention relates to colophony rosins modified in a specific manner, a process for preparing such specifically modified colophony rosins, their use as paper-sizing agents and paper-sizing agents in the form of aqueous dispersions containing such specifically modified colophony rosins.

The use of aqueous dispersions containing colophony rosins for sizing papers has been known for a long time and is described for example in Casey, Pulp and Paper, 2nd edition, volume II: Papermaking, pages 1043–1066, Interscience Publ., New York, 1961. For this purpose the colophony rosins, for example wood rosin, gum rosin, tall oil rosin and the like are usually reinforced, i.e. reacted with $\alpha,\beta$-unsaturated carbonyl compounds or formaldehyde before they are processed into dispersions. This reinforcement is intended to increase the efficiency of the sizing agents and, in the case of formaldehyde, to reduce the tendency, if present, towards crystallization. The reaction of the colophony rosins with $\alpha,\beta$-unsaturated carbonyl compounds, for example with acrylic acid, fumaric acid, maleic acid or their accessible anhydrides, is based on the formation of an adduct, according to the Diels-Alder reaction, with rosin acids of an appropriate structure contained in the colophony rosin,, for example with laevopimaric acid.

In U.S. Pat. No. 3,044,890 paper-sizing agents are described which contain colophony rosins which are reinforced with $\alpha,\beta$-unsaturated carbonyl compounds and are additionally esterified. Glycerol and ethylene glycol are named as esterification components.

In German Pat. No. 1,131,348 paper sizes are described which either predominantly contain saponified rosins (rosin soaps) and a low amount of unsaponified rosin (free rosin) or predominantly unsaponified rosins and a certain amount of rosin soaps. The latter, so-called free rosin sizes, can contain auxiliary emulsifiers and stabilizers, such as stearates, triethanolamine, casein, waxes, as well as fillers and other additives, triethanolamine being used additionally or instead of alkalies for the saponification of the rosin acids and not, as in the present invention, as the alcohol component, for the formation of rosin acid triethanolamine ester. According to German Pat. No. 1,131,348 reinforced rosins contain adducts of colophony resin and maleic anhydride in addition to unchanged rosin. In order to make reinforced rosins more readily dispersible the proposal is made to add small quantities of fatty acids and/or naphthenic acids to these.

In the production of paper all hitherto known paper sizes containing reinforced resins are used in the acid range, in general at pH values of below 6. At higher pH values, for example even at pH values between 6 and 7 considerable problems occur. Thus considerable differences in quality may be produced in the paper web as a result of variable quantities of chalk-containing waste originating from various additions of aluminum sulphate, which are in turn necessary for maintaining a constant pH value. The pH interval between 6 and 7 is not high enough to provide the lower risk of corrosion and the saving of beating energy achieved in the neutral to alkaline pH range.

The method carried out in the acid range is also associated with disadvantages. Thus in this range sharpedged Gypsum crystals may form by the reaction of calcium carbonate and aluminum sulphate, which make the finished paper unusable as a result of doctor streaks or cuts and may damage the polished cylinder of the paper-making machine. Also in the acid range a conversion of calcium carbonate into soluble calcium hydrogencarbonate is possible which causes an increase in the degree of hardness of the recycle water in the paper-making machine. Finally, only kaolin, which is relatively costly, can be used as filler in the acid range, and not less costly chalk or chalk-containing waste products from coating plants. The main disadvantage of sizing in the acid range is however, as J. Kaltenbach, for exaxmple, states in "Die neuzeitliche Papierleimung" (Modern paper-sizing), 2nd edition (1974), Vlg. Dr. Martin Sändig GmbH., Walluf, page 219, the limited resistance to ageing of the sized paper, since acid residues cause the paper to become yellow and brittle.

These disadvantages can be avoided by so-called neutral sizing, i.e. sizing in the pH range above 7, although the known rosin sizes can then no longer be used. Only synthetically produced sizing agents have been known hitherto for neutral sizing, for example dispersions containing long-chain dimeric alkyl ketenes. As W. Kamutzki and Th. Krause note in "Wochenblatt für Papierfabrikation" (Paper-manufacturing weekly), booklet No. 7 (1983), pages 215–222, such sizing agents do however have the serious disadvantage that they are not compatible with aluminum sulphate, which is used for many different purposes in paper mills. Also, partial sizing can only be carried out with great difficulties using such sizing agents.

Modified colophony rosins based on colophony rosins reinforced with formaldehyde and/or $\alpha,\beta$-unsaturated carbonyl compounds have now been found which are characterized in that they are additionally esterified with tertiary amino alcohols.

The colophony rosins modified according to the invention can be derived from the customary colophony rosins, e.g. from wood rosin, gum rosin, tall oil rosin or any desired mixtures of such rosins. It is also possible for these colophony rosins to have been pretreated; they may, for example, have been subjected to disproportionation or treatment with formaldehyde. In addition up to 10% by weight, based on the starting rosin, of customary extenders, for example waxes and/or low-grade tall oil derivatives, may be contained in the starting rosins.

The reinforcement with $\alpha,\beta$-carbonyl compounds may have been carried out in the customary manner, for example using fumaric acid, maleic acid, maleic anhydride or mixtures thereof. The use of 3 to 12% by weight of $\alpha,\beta$-unsaturated compounds, based on the starting rosin, is customary for this procedure. If an additional treatment with formaldehyde is carried out, 0.5 to 2% by weight of formaldehyde, based on the starting rosin, are customarily used.

The essential feature of the colophony rosins modified according to the invention is that they are esterified with tertiary amino alcohols in addition to being reinforced with formaldehyde and/or $\alpha,\beta$-unsaturated carbonyl compounds. The esterification with tertiary amino alcohols may have been carried out before or after the reinforcement. In this case the esterification with the tertiary amino alcohols also takes place preferably at the carboxyl groups of the rosin acids even if the rosins have already been reacted with an α,β-unsaturated carbonyl compound. Both from an analytical and from an applicational point of view no fundamental differences can be found between rosins modified according to the invention, which have been first reinforced and then esterified with tertiary amino alcohols, and those which have been first esterified with tertiary amino alcohols and then reinforced.

Tertiary amino alcohols suitable for the esterification are for example those of the formula (I)

in which
the radicals $R_1$, $R_2$ and $R_3$ can be identical or different and represent a $C_1$ to $C_6$ alkyl radical or a $C_1$ to $C_6$ hydroxyalkyl radical,
at least one of the radicals $R_1$ to $R_3$ representing a $C_1$ to $C_6$ hydroxyalkyl radical. Preferred tertiary amino alcohols are triethanolamine and triisopropanol amine.

The esterification with tertiary amino alcohols can for example be carried out with a quantity of 2.5 to 10% by weight of one or more tertiary amino alcohols, based on the starting rosin used. This quantity is preferably 4 to 8% by weight. The tertiary amino alcohols are furthermore preferably used in a weight ratio of tertiary amino alcohols to α,β-unsaturated compounds of 0.5 to 3.1:1. This weight ratio is particularly preferably 0.6 to 1.1:1.

Suitable esterification temperatures are for example those in the range of 170° to 250° C. The esterification temperature is preferably in the range of 200° to 220° C. The temperature can be kept constant during the esterification or can be varied within the stated limits. The esterification is preferably carried out until the acid number of the reaction mixture remains constant.

It is not only possible to add the aforementioned customary extenders to the starting rosin, but also to add them at any desired time, for example after the reinforcement and/or after the esterification. It is also possible to omit the addition of extenders.

The present invention further relates to a process for the preparation of modified colophony rosins which is characterized in that optionally pre-treated colophony rosins are, in any desired order, reinforced with formaldehyde and/or α,β-unsaturated carbonyl compounds and esterified with tertiary amino alcohols. Suitable starting rosins are for example wood rosin, gum rosin, tall oil rosin or any desired mixtures of such rosins. These rosins may optionally be pre-treated, for example, they may have been subjected to disproportionation or treatment with formaldehyde. In addition, up to 10% by weight, based on the starting rosin, of customary extenders, for example waxes and/or low-grade tall oil derivatives may be contained in the starting rosins.

The reinforcement with α,β-unsaturated carbonyl compounds can be carried out in the customary manner, for example using fumaric acid, maleic acid, maleic anhydride or mixtures thereof, which can be used for example in quantities of 3 to 12% by weight based on the starting rosin. Suitable reaction temperatures are for example those in the range of 170° to 250° C. If an additional treatment with formaldehyde is carried out 0.5 to 2% by weight, for example, of formaldehyde, based on the starting rosin, can be used and reaction temperatures in the range of 170° to 250° C. can be employed.

The esterification with tertiary amino alcohols can for example be carried out using tertiary amino alcohols of the formula (I)

in which
the radicals $R_1$, $R_2$ and $R_3$ can be identical or different and represent a $C_1$ to $C_6$ alkyl radical or a $C_1$ to $C_6$ hydroxyalkyl radical, at least one of the radicals $R_1$ to $R_3$ representing a $C_1$ to $C_6$-hydroxyalkyl radical. Triethanolamine and triisopropanol amine are preferred for the esterification.

The tertiary amino alcohols can for example be used in a quantity of 2.5 to 10% by weight based on the starting rosin. This quantity is preferably 4 to 8% by weight. The tertiary amino alcohols are furthermore preferably used in a weight ratio of tertiary amino alcohols to α,β-unsaturated carbonyl compounds of 0.5 to 3.1:1. This weight ratio is particularly preferably 0.6 to 1.1:1.

Suitable esterification temperatures are for example those in the range of 170° to 250° C. The esterification temperature is preferably in the range of 200° to 220° C. The temperature can be kept constant during the esterification or can be varied within the indicated limits. The esterification is carried out until the acid number of the reaction mixture remains constant. At that stage up to 90% of the hydroxyl groups introduced with the tertiary amino alcohols have, in general, reacted with the carboxyl groups of the rosin acids to form the corresponding rosin acid esters, an equivalent amount of water being split off. The water split off is appropriately removed from the reaction mixture.

It is not only possible for the aforementioned customary extenders to have been added to the starting rosin, they can also be added at any desired time, for example after the reinforcement and/or after the esterification. It is also possible to omit the addition of extenders.

The present invention furthermore relates to the use of the above-described specifically modified colophony rosins for the preparation of paper-sizing agents. The paper-sizing agents can be prepared in a manner known per se, the only difference being that the above described rosins which are reinforced with formaldehyde and/or α,β-unsaturated carbonyl compounds and are additionally esterified with tertiary amino alcohols, are used instead of the known rosins.

The present invention also relates to paper-sizing agents in the form of aqueous dispersions which are characterized in that they contain the above-described modified colophony rosins, that is to say colophony rosins which are reinforced with formaldehyde and/or α,β-unsaturated carbonyl compounds and are additionally esterified with tertiary amino alcohols.

Paper-sizing agents according to the invention contain, for example, 50 to 70% by weight of water, 25,5 to 47.5% by weight of colophony rosins, in the form of free rosin, which are reinforced with formaldehyde and/or α,β-unsaturated carbonyl compounds and esterified with tertiary amino alcohols, 1.5 to 10% by weight of saponified rosins of the aforementioned kind, 0.1 to 0.5% by weight of additives, and 1.5 to 6% by weight of emulsifiers and stabilizers.

Additives can for example be defoaming agents and biocidally active compounds.

Suitable emulsifiers which can also be effective as stabilizers, are for example casein and alkyl sulphonates.

The paper-sizing agents according to the invention can be prepared in a manner known per se, for example by the so-called inversion process. In this the rosin is first converted into a water-in-oil emulsion at temperatures of for example 120° to 180° C. with vigorous stirring and the addition of aqueous alkali, for example sodium hydroxide solution, potassium hydroxide solution and/or an aqueous borax solution and emulsifiers, and this water-in-oil emulsion is then inverted by the addition of water, that is to say it is converted into an oil-in-water emulsion. The content of free rosin is regulated by the quantity of alkali added and the solids content by the quantity of water added.

The content of free rosin in the paper-sizing agents according to the invention is preferably 85 to 95% by weight, based on the total amount of rosin present. The solids content of the paper-sizing agents according to the invention is preferably 30 to 50% by weight, based on the ready-to-use paper-sizing agent.

The colophony rosins modified according to the invention and paper-sizing agents containing these have a number of surprising advantages. They can be used for sizing in an acid, neutral and weakly alkaline range for example in a pH range of 4 to 8.5, preferably in a pH range of 6 to 8, and both for complete and for partial sizing. They combine the advantages of rosin sizes, for example their compatibility with aluminum sulphate, with the possibility of carrying out sizing in a neutral to weakly alkaline range, in which procedure kaolin can be replaced by cheap chalk or chalk-containing waste materials from coating plants, there is no formation of gypsum from chalk and aluminum sulphate and no formation of calcium hydrogencarbonate, the quantities of aluminum sulphate required are considerably lower, but above all the ageing resistance of the paper is greatly increased by the suppression of yellowing and embrittlement—such a combination having hitherto not been possible. Furthermore it is possible to counteract difficulties which may arise, such as for example damage-producing rosin, i.e. rosin deposits caused by the pulp on couch or drier cylinders—so called peel substances, by sizing in the acid range and increasing the amount of aluminum sulphate added.

The advantages obtainable with the colophony rosins modified according to the invention are especially suprising since these advantages cannot be obtained with colophony resins esterified with other alcohols than tertiary amino alcohols and reinforced with α,β-unsaturated carbonyl compounds (see, for example, U.S. Pat. No. 3,044,890). Thus using dispersions prepared from the above-described resins or from reinforced resins so prepared which were similarly esterified with polyhydric alcohols, such as glycerol, propylene glycol or pentaerythritol, it was possible to achieve a sizing effect in the acid range but not in the alkaline pH range.

The following examples illustrate the present invention without limiting it in any way.

EXAMPLES

EXAMPLE 1

100 parts by weight of tall oil rosin with an acid number of 170 were heated to 210° C. and 8 parts by weight of triethanolamine were added slowly during a period of 20 minutes. The temperature was maintained until the acid number remained constant, which took 2.5 hours. The acid number of the rosin was 89 at that point in time. Then 9 parts by weight of maleic anhydride were added in portions over a period of 20 minutes and the mixture was kept at 210° C. for a further hour. The rosin modified in this way had an acid number of 142 and a softening point of 79° C.

EXAMPLE 2

100 parts by weight of tall oil rosin having an acid number of 170 were heated to 210° C. and 9 parts by weight of maleic anhydride were added in portions over a period of 20 minutes. At the end of one hour the acid number was 200. Then 8 parts by weight of triethanolamine were added slowly over a period of 20 minutes and the temperature of 210° C. was maintained for 2.5 hours, the acid number reaching a constant value of 143. The softening point of the rosin thus modified was 80° C.

EXAMPLE 3

100 parts by weight of tall oil rosin having an acid number of 170 were heated to 210° C. and reacted with 1.5 parts by weight of paraformaldehyde and 0.15 parts by weight of p-toluenesulphonic acid for one hour at 210° C. Then 9 parts by weight of maleic anhydride were added slowly over a period of 20 minutes and the mixture was maintained at this temperature for a further hour. The acid number was 196 at this point in time. Then 6.3 parts by weight of triethanolamine were added slowly to the mixture over a period of 20 minutes and the temperature was maintained at 210° C. for 2 hours, the acid number reaching a constant value of 132. The softening point of the rosin modified in this manner was 85° C.

EXAMPLE 4

100 parts by weight of tall oil rosin having an acid number of 170 were disproportionated by being heated at 270° C. for two hours. After cooling to 210° C. 7.5 parts by weight of triethanolamine were added slowly over a period of 20 minutes and this temperature was maintained until a constant acid number of 84 was obtained, which took 2.5 hours. Then 7 parts by weight of maleic anhydride were added in portions over a period of 20 minutes and the mixture was maintained at 210° C. for a further hour. The rosin modified in this manner had an acid number of 116 and a softening point of 74.5° C.

EXAMPLE 5

100 parts by weight of tall oil rosin having an acid number of 170 were disproportionated by being heated at 270° C. for 2 hours. After cooling to 210° C. 5 parts by weight of maleic anhydride were added in portions over a period of 20 minutes. After one hour, at which point in time the acid number was 182, 4.5 parts by weight of triethanolamine were added slowly over a period of 20 minutes. The temperature of 210° C. was maintained until a constant acid number of 133 was reached, which took 2 hours. The softening point of the rosin modified in this manner was 73° C.

EXAMPLE 6

The same procedure was followed as in Example 4 except that 10% of the maleic anhydride was replaced by fumaric acid. The rosin obtained had an acid number of 120 and a softening point of 79° C.

EXAMPLE 7

The same procedure was followed as in Example 4 except that 50% of the maleic anhydride was replaced by fumaric acid. The rosin obtained had an acid number of 143 and a softening point of 88.1° C.

EXAMPLE 8

100 parts by weight of tall oil resin having an acid number of 170 were heated to 210° C. and 7.5 parts by weight of fumaric acid were added in portions over a period of 20 minutes. At the end of one hour the acid number was 224. Then 5 parts by weight of triethanolamine were added slowly over a period of 20 minutes and the temperature was increased to 230° C. and maintained for 2 hours, the acid number reaching a constant value of 141. The softening point of the rosin modified in this manner was 85° C.

EXAMPLE 9

100 parts by weight of tall oil resin having an acid number of 170 were heated to 210° C. and 9.4 parts by weight of maleic anhydride were added in portions over a period of 20 minutes. At the end of one hour the acid number was 190.8. Then 6 parts by weight of trisopropanol amine were added in portions over a period of 20 minutes and the temperature of 230° C. was maintained for 3 hours the acid number reaching a constant value of 146.8. The softening point of the rosin modified in this manner was 83° C.

EXAMPLE 10 (for comparison purposes)

100 parts by weight of tall oil rosin having an acid number of 170 were heated to 210° C. and 7 parts by weight of maleic anhydride were added in portions over a period of 20 minutes. At the end of one hour the acid number was 185. Then 5 parts by weight of propylene glycol were added slowly over a period of 20 minutes and the temperature of 210° C. was maintained for 3 hours, the acid number reaching a constant value of 148. The softening point of the rosin modified in this manner was 77° C.

EXAMPLE 11 (for comparison purposes)

100 parts by weight of tall oil rosin having an acid number of 170 were heated to 210° C., 8.5 parts by weight of fumaric acid were added in portions over a period of 20 minutes and the mixture was maintained at this temperature for one hour. The acid number of the rosin modified in this manner was 235 and the softening point was 81° C.

EXAMPLE 12

100 parts by weight of each of the rosins prepared according to Examples 1 to 11 were melted at 150° C. and 10 parts by weight of a 25% by weight aqueous borax solution were added slowly with vigorous stirring. 7 parts by weight of casein and 225 parts by weight of water were added slowly to the resulting water-in-oil emulsion until an oil-in-water emulsion was formed. The aqueous dispersions obtained in this manner were stable and had a solids content of 30 to 31% by weight and a pH value of between 6.0 and 6.5.

EXAMPLE 13

In order to test the quality of the dispersions prepared according to Example 12 circular paper test sheets of a diameter of 20 cm were produced on a sheet-forming apparatus of type G 8 E from the Gockel company, Munich. The test sheets were produced at various pH values, using varying quantities of size, calculated as solid rosin on oven-dry paper, and with or without the use of chalk as a filler. The pulp used consisted of a ratio of spruce to beech of 70:30 and had a degree of beating of 27° SR. The necessary quantity of size and, if appropriate, a cationic polysaccharide, as retention agent, were added to a 0.24% by weight suspension of the pulp in water with chalk as the filler. Then an aluminum sulphate solution was added in a quantity of 1% by weight of solid aluminum sulphate on oven-dry paper, in order to adjust the pH value to 7.2 to 7.4. Any necessary correction was carried out in the slush pulp using aqueous sodium hydroxide solution. The chalk was introduced as a 70% by weight dispersion. After filtering off the water of dilution by suction the fibre mat was pre-dried at 80° C. to a moisture content of 15% and drying was then completed in a photo-drier for 5 minutes at 120° C. The finished test sheets had an average weight of 2.3 g without and 2.6 g with chalk and were subjected to a Cobb test 60. The pH value of the pulp suspension was increased gradually during which it was found that (up to a pH value of 8) no significant changes occurred in the sizing. Ink float tests were carried out at the same time in which test strips were each left in the testing ink for 3 minutes. The visual comparison of the individual specimens showed agreement with the results of the Cobb test.

The results of the Cobb test can be seen in Table 1.

TABLE 1

Water-absorbing capacity in g per m$^2$ (Cobb value)
The values given are average values from at least 6 individual determinations.
The dispersions prepared according to example 12 were used for sizing.

| Dispersion of the rosin obtained according to Example | 0.4% 2% 5,8 | 0,35% 1% 7,4 | ⌀ 16% 0,7% 1% 7,4 | chalk/paper rosin/paper aluminum sulphate/paper pH value |
|---|---|---|---|---|
| 1 | 16 | 18 | 16 | |
| 2 | 16 | 19 | 17 | |
| 3 | 17 | 20 | 20 | |
| 4 | 16 | 21 | 18 | |
| 5 | 15 | 18 | 17 | |
| 6 | 15 | 20 | 19 | |
| 7 | 18 | 19 | 20 | |
| 8 | 17 | 18 | 18 | |
| 9 | 16 | 18 | 18 | |
| 10 | 21 | >60 | >60 | |
| 11 | 16 | >60 | >60 | |

What is claimed is:

1. A colophony rosin reinforced with formaldehyde and/or an α,β-unsaturated carbonyl compound and additionally esterified with an amino alcohol, wherein the colophony rosin is esterified with 2.5 to 10% by weight with one or more tertiary amino alcohols, based on the starting rosin.

2. A colophony rosin according to claim 1 consisting essentially of one reinforced by an agent consisting essentially of said formaldehyde and/or α,β-unsaturated carbonyl compound and esterified with an esterifying agent consisting essentially of one or more tertiary amino alcohols.

3. A colophony rosin according to claim 1 wherein said rosin is esterified with said tertiary amino alcohol at 170° to 250° C.

4. A colophony rosin according to claim 1 wherein said colophony rosin is a wood rosin, gum rosin, tall oil rosin or a mixture thereof.

5. A colophony rosin according to claim 4 which has been pre-treated.

6. A colophony rosin according to claim 5 additionally containing an extender.

7. A colophony rosin according to claim 1 wherein said one or more tertiary amino alcohols have the formula

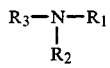

wherein
$R_1$, and $R_2$ and $R_3$ are identical or different and represent a $C_1$ to $C_6$ alkyl radical or $C_1$ to $C_6$ hydroxy alkyl radical, at least one of the radicals $R_1$, $R_2$ and $R_3$ representing a $C_1$ to $C_6$ hydroxy alkyl radical.

8. A colophony rosin according to claim 1 which has been reinforced with formaldehyde and/or an $\alpha,\beta$-unsaturated carbonyl compound before being esterified with said tertiary amino alcohol.

9. A colophony rosin according to claim 1 wherein said rosin has been esterified with said tertiary amino alcohol before being reinforced with said formaldehyde and/or an $\alpha,\beta$-unsaturated carbonyl compound.

10. A colophony rosin according to claim 1 reinforced with formaldehyde.

11. A colophony rosin according to claim 1 reinforced with $\alpha,\beta$-unsaturated carbonyl compound.

12. A colophony rosin according to claim 11 wherein said $\alpha,\beta$-unsaturated compound is fumaric acid, maleic acid, maleic anhydride or a mixture thereof.

13. A colophony rosin according to claim 12 wherein said $\alpha,\beta$-carbonyl compound is maleic anhydride.

14. A colophony rosin according to claim 1 for sizing in a pH range of 6 to 8.

15. A paper sizing agent in the form of an aqueous dispersion, said aqueous dispersion containing the colophony rosin of claim 1.

16. A paper sizing agent according to claim 15 containing 50 to 70% by weight of water, 25.5 to 47.5% by weight of a colophony rosin reinforced with formaldehyde and/or an $\alpha,\beta$-unsaturated carbonyl compound and additionally esterified with an amino alcohol, wherein the colophony rosin is one esterified with 2.5 to 10% by weight of one or more tertiary amino alcohols, based on the starting rosin, said rosin being in the form of free rosin, said paper sizing agent additionally containing 1.5 to 10% by weight of said colophony rosin in saponified form.

17. A paper sizing agent according to claim 16 additionally containing 0.1 to 0.5% by weight of an additive and 1.5 to 10% by weight of an emulsifier, stabilizer or mixture thereof.

18. A paper sizing agent according to claim 17 for sizing in a pH in the range of 6 to 8.

19. A process for preparing an improved colophony rosin which comprises esterifying a colophony rosin with one or more tertiary amino alcohols in an amount of 2.5 to 10% by weight based upon the weight of the starting rosin and reinforcing the same by contacting said rosin with formaldehyde and/or $\alpha,\beta$-unsaturated carbonyl compound.

20. A process according to claim 19 wherein said rosin is reinforced with formaldehyde and/or an $\alpha,\beta$-unsaturated carbonyl compound before being esterified with one or more tertiary amino alcohols and the esterification of said rosin with said tertiary amino alcohols is effected at 170° to 250° C.

21. A process according to claim 19 wherein said rosin is esterified with said one or more tertiary amino alcohols at 170° to 250° C. before being reinforced with said formaldehyde and/or $\alpha,\beta$-unsaturated carbonyl compound.

22. A process according to claim 19 wherein said colophony rosin is reinforced with an $\alpha,\beta$-unsaturated carbonyl compound and said tertiary amino alcohol is employed in a weight ratio to said $\alpha,\beta$-unsaturated carbonyl compound of 0.5 to 3.1:1.

23. A paper sized with the colophony rosin of claim 1.

* * * * *